(No Model.)
2 Sheets—Sheet 1.
E. ULBRICHT.
PNEUMATIC TIRE.
No. 473,034. Patented Apr. 19, 1892.
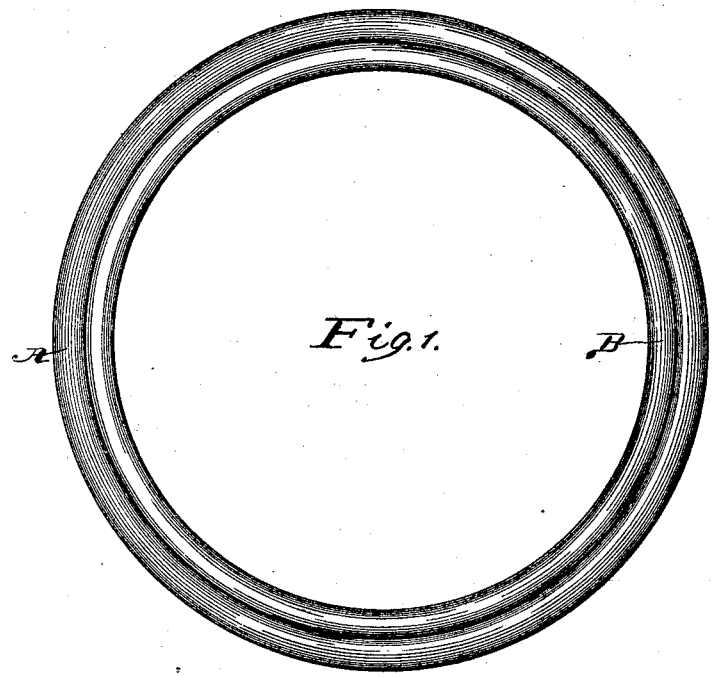
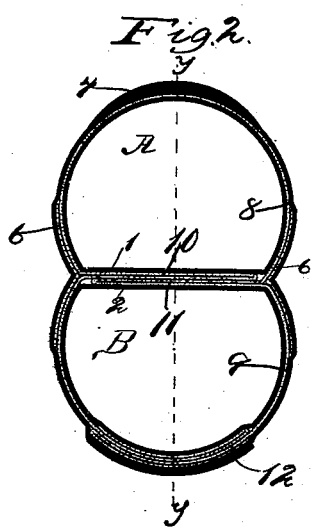 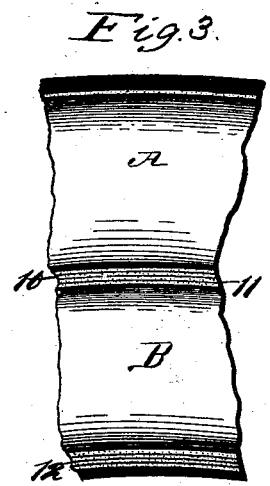 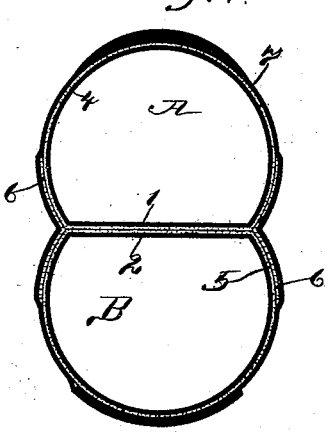
Witnesses
W. D. Middleton.
R. M. Wagner.
Inventor
Emil Ulbricht
By Chas. G. Page
Atty (No Model.) 2 Sheets—Sheet 2.

E. ULBRICHT.
PNEUMATIC TIRE.

No. 473,034. Patented Apr. 19, 1892.

Witnesses
Inventor
Emil Ulbricht
By Chas. G. Page
Atty

UNITED STATES PATENT OFFICE.

EMIL ULBRICHT, OF CHICAGO, ILLINOIS.

PNEUMATIC TIRE.

SPECIFICATION forming part of Letters Patent No. 473,034, dated April 19, 1892.

Application filed December 30, 1891. Serial No. 416,554. (No model.)

*To all whom it may concern:*

Be it known that I, EMIL ULBRICHT, a citizen of the United States, residing at Chicago, in the county of Cook and State of Illinois, have invented a certain new and useful Improvement in Pneumatic Wheel-Tires for Velocipedes, of which the following is a specification.

The object of my invention is to provide a highly-elastic, easy-running, and durable construction of pneumatic tire and to prevent the tubular tire from being cut by the wheel-rim during its travel over sudden obstructions in the road. To the attainment of the foregoing and other useful ends I construct the tire with a couple of concentrically-arranged tubes, which, when blown up, serve to provide two annular elastic cushions, one within the other. The tubes are also so confined or held that when blown up they shall have or be compelled to assume a segmental or arch shape in cross-section, with the annular flat side portion of one tube against the corresponding portion of the remaining tube. In order to secure this ultimate form of tubing, I prefer providing a holder or pocket covering, which is subdivided into a couple of concentrically-arranged annular tube-holding spaces and formed of some suitable flexible material. This pocket-covering is also so made that when the tubes are inflated they will flatten along their annular opposing portions, and thus each assume a segmental or substantially segmental shape, as hereinafter more fully described in connection with the drawings. By holding together a couple of tubes, which, when inflated, are of segmental or arch shape in cross-section, with the inner annular flat side portion of the outer tube against the annular outer or peripheral flat side portion of the inner tube, the strength, durability, and elastic resistance of each tube are materially increased and the tire rendered more durable and less liable to rupture. Where a single tube is employed, it is liable to become so depressed in running over a sharp obstacle as to become cut by sudden contact with the side portions of the wheel-rim; but by employing a couple of concentrically-arranged tubes I avoid such accidents and am also enabled to dispense with the use of auxiliary springs and the like within the tube; also, should the outer tube become punctured the inner tube will not be effected by such accident.

Figure 5:
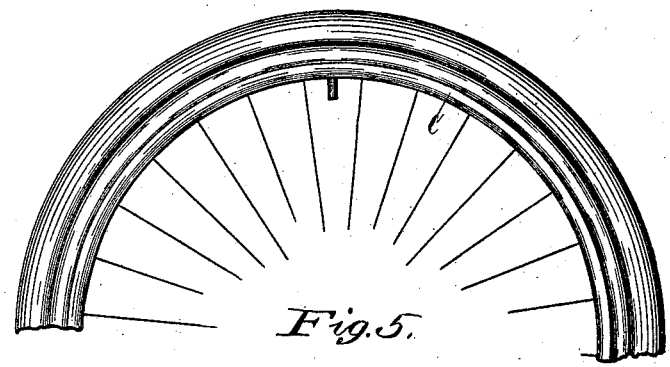
Figures 6, 7:
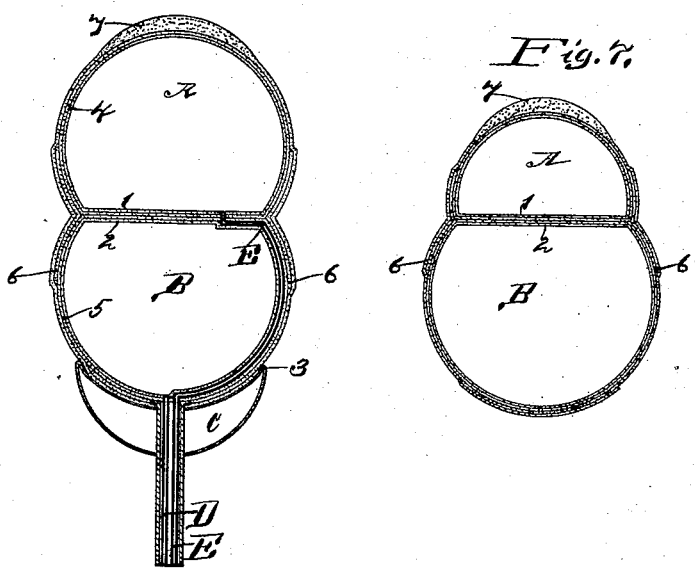

In the accompanying drawings, in which the tubes are for convenience of illustration shown in an inflated condition, Figure 1 represents in elevation a pneumatic wheel-tire embodying my invention. Fig. 2 represents on a larger scale a cross-section through a portion of the tire and illustrates one of various ways in which the two tubes can be held together. Fig. 3 is a section taken through a portion of the tire constructed as in Fig. 2, the section being taken on line $y$ $y$ in said last-named figure. Fig. 4 is a section similar to the one in Fig. 2, but illustrates another way in which the tubes can be held together. Fig. 5 illustrates a portion of the wheel-rim with my improved tire applied, the scale of this figure being the same as in Fig. 1. Fig. 6 is a cross-section through a portion of the tire and wheel-rim on a larger scale and illustrates one of various ways in which the tubes can be blown. Fig. 7 is a like section showing the outer tube made smaller than the inner tube.

In said drawings, A indicates one and B the other of a couple of concentrically-arranged expansible hollow air-tubes, which are held together so as to form a pneumatic wheel-tire and which for the sake of convenience may be referred to as the "outer" and "inner" tubes. The outer tube A could be made larger in cross-section than the inner tube, or it can be made smaller in cross-section than the inner tube B, as in Fig. 7, or the tubes can be of corresponding size in cross-section, it being apparent that by thus employing two tubes no limitation is necessarily placed upon the size and shape of the outer tube. The tubes when inflated assume each a segmental or arch shape in cross-section, so as to provide the outer tube A with a continuous flat inner side portion 1 and provide the inner tube B with a continuous flat outer or peripherally-arranged flat side portion 2, corresponding with the flat inner side portion of the outer tube. The two flat side portions of the two tubes are opposed to one another, as illustrated, and while rendering the tire compact such construction will also add materially to its strength, durability, and elastic resistance, since by providing inflated tubes of segmental shape in cross-section they are each practically of arc shape, and will thereby offer greater elastic resistance to a resistance tending to depress them than would be offered by an inflated tube cylindric in cross-section. This increased elastic resistance on the part of the form of tube herein involved also renders the machine easy-riding, since where the tube of a pneumatic tire flattens to any extent upon the ground the free running of the wheel is necessarily retarded. The union of the flattened side portions 1 and 2 of the tubes also provides a wall of increased thickness and strength between the two segmental or arched spaces within the tubes, and hence each tube contributes in this way, as well as other ways, to the efficiency of the other. It will also be seen that with the foregoing-described construction it will be impracticable for the outer inflated tube to become so depressed as to come in contact with the side edge portions 3 of the wheel-rim C, and that a severe depression on the part of the outer tube at any point will be taken up by the inner tube and so distributed along the latter as to avoid all danger of the latter becoming injured by the wheel.

As a means for holding and covering and also for compelling the tubes A and B to assume when inflated the cross-sectional shape illustrated, I provide a non-expansible annular flexible holder or pocket covering—that is to say, I provide an annular pocket or holder formed by a tube of some suitable flexible material, such as canvas. This annular pocket or pocket covering may be of one or more pieces, but is preferably formed by two parts which are so united together as to subdivide the annular pocket into two concentric spaces, one for each tube, and thereby provide in effect a reinforcing-partition between the tubes, the reinforcing-partition in such case corresponding with the width of each flattened portion of one of the tubes. As a whole, however, the pocket can be only so distended relatively to the possible distention of the tubes as to cause the latter when inflated to crowd against one another, and thereby flatten along their opposing portions. Where the pocket-covering is thus made in two parts and united so as to form an annular partition between the tube-holding spaces, the two said parts of the pocket (which in one sense form two pockets) are united along such portion of what may be termed their "transverse" width as shall correspond in width to the desired width of the flat annular side portion of each inflated tube, it being understood that the term "annular flat side" is employed in contradistinction to the transversely-rounded portion of the tube, and that more strictly speaking the remaining annular portion of the tube is flat transversely or flat in cross-section. The pocket portions or sub-pockets thus united serve to hold the tubes A and B, which are placed within the pocket-spaces in an uninflated condition. When, however, the tubes are blown up, the pocket-covering and tubes assume the form in cross-section herein illustrated. If one tube only is blown up, it will of course assume a cylindric condition, since the wall portion of its pocket-space which is united to the wall of the other pocket-space would be depressed within the latter; but by blowing up both of the tubes one will meet and oppose the other, whereby they will fill out the pocket-spaces, as shown, and flatten along their annular opposing portions.

The annular pocket-spaces in effect constitute a single annular pocket-space capable of receiving the uninflated tubes, but only capable of distention to such extent that when the tubes are inflated the resistance of one to the other will cause both to flatten, it being apparent that the restricted size of the pocket-covering proportionally to the possible size of an inflated tube will cause such result.

In Fig. 4 I have shown the tubes incased within corresponding annular pocket portions 4 and 5, respectively, which said pocket portions can be of canvas or other suitable flexible covering material. Reinforcing side pieces 6 are also applied to opposite sides of the tire so as to cover the seam or line of junction between the tubes, and about the tire thus covered I preferably provide an outer coating or covering 7 of rubber, it being understood that the tire thus constructed can be vulcanized.

In Fig. 2 the canvas or analogous pocket portions 8 and 9 for the tubes are formed and arranged with portions of the material of which they are made placed infolded between the tubes, as at 10 and 11, a portion of the material of which pocket portion 9 is made being also arranged so as to lie in folds, as at 12, between the inner portion of the tube and its allotted seat along the wheel-rim. Reinforcing-strips 6 and an outer covering 7 of rubber are applied as hereinbefore described.

The portions of the pocket-covering shown arranged against one another can be united by glue or cement or other suitable means, and by arranging the united portions of the pocket-covering in folds I provide stouter or reinforced flattened portions.

Any suitable or desired means can be provided for blowing up the tubes. In Fig. 6 I have shown a tube D, through which air can be forced into the tube B, and a tube E, through which air can be forced into the tube A, it being understood that the tubes can be made flexible and closed in any suitable way. By thus providing means for separately blowing up the tubes no communication need be made between them, and hence should the outer tube become punctured during use the inner tube will not be affected, and thus the rider can ride home on a pneumatic tire without injury to the wheel-rim and without affecting the inner tube. I may also in the first instance make each tube segmental in cross-section; but I prefer as a simpler and more economical way to provide ordinary tubes and confine them within pocket or pocket-spaces so formed that when the tubes are blown up they shall assume such segmental shape in cross-section; but in either case the pneumatic tire as a completed working article is composed of two concentrically-arranged expansible hollow air-tubes A and B, each of arch or D shape in cross-section, which said tubes are arranged one over the other (in contradistinction to a tire known as the "Siamese twins" and involving a couple of air-tubes arranged side by side) with their flattened side portions 1 and 2 held together at or about midway between the perimeter of the tire and the perimeter of the wheel-rim, and the tubes thus arranged are confined within a non-expansible cover 4 and 5, made of one or more pieces and corresponding in cross-section with the transverse outline of the unflattened portions of said two tubes thus arranged. With said arrangement the tread portion of the tire is provided by the inflated tube A, and this tread portion is supported by a cushion provided by the inflated tube B, which in turn seats upon the wheel-rim and fits the concave seat which the latter provides.

What I claim as my invention is—

1. A pneumatic tire composed of two concentrically-arranged expansible hollow air-tubes A and B, each of arch or D shape in cross-section, said tubes being arranged one over the other with their flattened side portions 1 and 2 held together and being confined within a non-expansible cover 4 and 5, corresponding in cross-section with the transverse outline of the unflattened portion of said two tubes arranged together, as aforesaid, the tread portion of the tire being provided by the inflated tube A, and the tread portion thus formed being supported by a cushion provided by the inflated tube B, which in turn seats upon the wheel-rim, substantially as and for the purpose described.

2. A pneumatic wheel-tire comprising a couple of tubes confined within an annular holder or pocket covering adapted, substantially as hereinbefore set forth, to compel the tubes when inflated to flatten along their opposing annular portions, and thereby assume a substantially segmental shape in cross-section, for the purpose described.

3. A pneumatic wheel-tire comprising a couple of tubes respectively confined within the annular pocket-spaces of an annular holder or pocket covering which is subdivided by an annular partition into said spaces for the tubes, substantially as and for the purpose described.

4. A pneumatic wheel-tire comprising a couple of concentrically-arranged tubes confined within a pocket covering and reinforcing-strips 6, applied to cover the lines of junction between the covered tubes.

5. A pneumatic wheel-tire comprising a couple of concentrically-arranged tubes and a pocket-covering 8 and 9, having portions arranged and held in folds between the tubes, substantially as and for the purpose described.

EMIL ULBRICHT.

Witnesses:
W. D. MIDDLETON,
CHAS. G. PAGE.